(12) United States Patent
Maro (10) Patent No.: US 10,806,066 B2
(45) Date of Patent: Oct. 20, 2020

(54) IMPLEMENT MULTI-COUPLER WITH BREAKAWAY FEATURE

(71) Applicant: Deere & Company, Moline, IL (US)

(72) Inventor: Randall A. Maro, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 236 days.

(21) Appl. No.: 15/984,145

(22) Filed: May 18, 2018

(65) Prior Publication Data

US 2019/0350118 A1 Nov. 21, 2019

(51) Int. Cl.

| | |
|---|---|
| *F16K 17/36* | (2006.01) |
| *A01B 61/02* | (2006.01) |
| *A01B 59/042* | (2006.01) |
| *A01B 59/00* | (2006.01) |
| *F16L 55/10* | (2006.01) |
| *A01B 59/06* | (2006.01) |
| *F16L 37/18* | (2006.01) |
| *A01B 59/043* | (2006.01) |
| *F16L 35/00* | (2006.01) |
| *B60K 17/28* | (2006.01) |
| *F16L 37/56* | (2006.01) |

(Continued)

(52) U.S. Cl.
CPC ............ *A01B 61/02* (2013.01); *A01B 59/002* (2013.01); *A01B 59/042* (2013.01); *A01B 59/043* (2013.01); *A01B 59/069* (2013.01); *B60D 1/36* (2013.01); *B60D 1/363* (2013.01); *B60D 1/64* (2013.01); *B60K 17/28* (2013.01); *F16L 35/00* (2013.01); *F16L 37/18* (2013.01); *F16L 37/56* (2013.01); *F16L 55/1015* (2013.01)

(58) Field of Classification Search
CPC ..... A01B 61/02; A01B 59/002; A01B 59/042; A01B 59/043; A01B 59/069; F16L 37/18; F16L 37/56; F16L 35/00; F16L 55/1015; B60D 1/64; B60D 1/243; B60D 1/36; B60D 1/363; B60K 17/28
USPC ................ 137/68.11, 68.14; 280/479.3, 421; 172/456; 403/44, 59, 93, 11, 322.4, 403/374.5, 374.1

See application file for complete search history.

(56) References Cited

U.S. PATENT DOCUMENTS

| | | | | |
|---|---|---|---|---|
| 3,650,333 | A | * 3/1972 | Fueslein | .............. A01B 73/044 |
| | | | | 172/311 |
| 4,674,525 | A | * 6/1987 | Richards | ............. F16L 55/1007 |
| | | | | 137/543.17 |
| 4,738,463 | A | 4/1988 | Poore et al. | |

(Continued)

FOREIGN PATENT DOCUMENTS

| | | |
|---|---|---|
| DE | 10200905607 A1 | 6/2011 |
| EP | 2399441 A | 12/2011 |

*Primary Examiner* — Minh Q Le
(74) *Attorney, Agent, or Firm* — Klintworth & Rozenblat IP LLP (57) ABSTRACT

A work vehicle multi-coupler assembly having a controlled breakaway feature include a pair of coupling elements that mate along a coupling axis. A shear pin is carried by one of the coupling elements. A coupler mechanism connected to the second coupling element and configured to engage the shear pin to bring the first coupling element into mating engagement with the second coupling element. The coupler mechanism is configured to shear the shear pin to permit movement of the first coupling element away from the second coupling element along the coupling axis during a breakaway event.

20 Claims, 7 Drawing Sheets

(51) Int. Cl.
*B60D 1/36* (2006.01)
*B60D 1/64* (2006.01)

(56) References Cited

U.S. PATENT DOCUMENTS

| | | | |
|---|---|---|---|
| 5,699,822 A * | 12/1997 | Bodhaine | F16L 29/00 |
| | | | 137/614.04 |
| 5,758,682 A | 6/1998 | Cain | |
| 5,997,320 A | 12/1999 | Demello | |
| 6,196,595 B1 * | 3/2001 | Sonerud | E02F 3/3631 |
| | | | 285/26 |
| 6,302,147 B1 * | 10/2001 | Rose | F16L 37/56 |
| | | | 137/614.03 |
| 6,588,513 B1 | 7/2003 | Gustafson | |
| 6,631,916 B1 | 10/2003 | Miller | |
| 6,691,794 B2 * | 2/2004 | Paluch | A01B 59/042 |
| | | | 172/311 |
| 7,290,977 B2 | 11/2007 | Albright | |
| 7,329,133 B2 * | 2/2008 | Ishikawa | H01R 13/62938 |
| | | | 439/140 |
| 7,464,967 B2 | 12/2008 | Mieger et al. | |
| 7,575,462 B2 | 8/2009 | Macey | |
| 7,670,157 B2 | 3/2010 | Miyamoto | |
| 7,959,451 B2 | 6/2011 | Tonosaki | |
| 8,336,922 B2 | 12/2012 | Tiberghien et al. | |
| 8,740,257 B2 | 6/2014 | Groβ | |
| 8,770,612 B2 * | 7/2014 | Wendte | B60D 1/363 |
| | | | 280/420 |
| 9,357,690 B2 | 6/2016 | Huegerich et al. | |
| 9,375,988 B2 * | 6/2016 | Huegerich | A01B 59/002 |
| 9,706,701 B2 * | 7/2017 | Prickel | A01C 7/208 |
| 9,968,021 B2 | 5/2018 | Emmert et al. | |
| 2006/0240693 A1 * | 10/2006 | Nishide | H01R 13/62938 |
| | | | 439/157 |
| 2006/0281351 A1 * | 12/2006 | Yamaoka | H01R 13/62938 |
| | | | 439/157 |
| 2011/0226527 A1 | 9/2011 | Ritchie-Bland | |

* cited by examiner

IMPLEMENT MULTI-COUPLER WITH BREAKAWAY FEATURE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to interfaces between implements and work vehicles and more particularly, to multi-coupler assemblies that join fluid lines extending from a work vehicle to an implement.

BACKGROUND OF THE DISCLOSURE

Work vehicles, such as those used in the agriculture, construction, forestry and mining industries, may have implements attached at the front and/or rear of the work vehicle. Example implements common in such industries include excavator and loader buckets, tillage machines, mowers, balers, planting machines, tree felling heads and so on. To perform operational movements (e.g., lifting, tool adjustment, baling, seeding, cutting, general orientation changes, etc.), the implements may have actuators (e.g., electric, hydraulic, pneumatic, etc.) that are powered by generators, pumps and motors that are driven by the engine of a host or towing work vehicle (e.g., tractor, loader, etc.). Flexible power lines may be used to connect the actuators of the implement with the work vehicle to which it is attached to allow for relative movement of the work vehicle and the implement when turning or traveling over uneven terrain. Depending on the application, numerous power lines may need to be connected and disconnected when attaching and detaching the implement. Inadvertent separation of the implement from the work vehicle may stress and damage the power lines and the components of the work vehicle and implement to which they are coupled.

SUMMARY OF THE DISCLOSURE

Work vehicle multi-coupler assemblies having designated breakaway features are provided. In one embodiment, a multi-coupler assembly includes a pair of coupling elements that mate along a coupling axis. A shear pin is carried by one of the coupling elements. A coupler mechanism is connected to the second coupling element and is configured to engage the shear pin to bring the first coupling element into mating engagement with the second coupling element. The coupler mechanism is configured to shear the shear pin to permit movement of the first coupling element away from the second coupling element along the coupling axis during a breakaway event.

In additional embodiments, a multi-coupler assembly for a work vehicle and implement coupling arrangement includes a coupling element that has a first bank of fluid connectors in continuous fluid communication with the implement. A tether is connected with the first coupling element and with the implement. The tether is configured to exert a pull force on the first coupling element during a breakaway event. A second coupling element is fixed to the work vehicle and has a second bank of fluid connectors in continuous fluid communication with the work vehicle. The second coupling element is configured to mate with the first coupling element along a coupling axis to place the first bank of fluid connectors in fluid communication with the second bank of fluid connectors. A shear pin is fixed to the first coupling element and a coupler mechanism is carried by the second coupling element. The coupler mechanism is configured to engage the shear pin to bring the first coupling element into mating engagement with the second coupling element. During the breakaway event the coupler mechanism is configured to shear the shear pin to move the second coupling element along the coupling axis and with the work vehicle away from the first coupling element and the implement, while the coupler mechanism remains stationary relative to the second coupling element.

In other embodiments, a multi-coupler assembly for a work vehicle and implement coupling arrangement includes a coupling element that has a first bank of fluid connectors in continuous fluid communication with the implement. A tether is connected with the first coupling element and with the implement. Another coupling element is fixed to the work vehicle and has a second bank of fluid connectors in continuous fluid communication with the work vehicle. The coupling elements are configured to mate along a coupling axis to place the first bank of fluid connectors in fluid communication with the second bank of fluid connectors. A shear pin is fixed to one coupling element and a coupler mechanism is carried by the other coupling element. The coupler mechanism is configured to engage the shear pin to bring the first coupling element into mating engagement with the second coupling element. The coupler mechanism includes a cam slot in which the shear pin is disposed when the first and second coupling elements are coupled together. The cam slot has an open end and a closed end with a segment adjacent the closed end that is disposed to extend in a direction substantially perpendicular to the coupling axis. During a breakaway event the coupler mechanism is configured to shear the shear pin to move one coupling element along the coupling axis and with the work vehicle away from the other coupling element and the implement, while the coupler mechanism remains stationary relative to its respective coupling element The details of one or more embodiments are set forth in the accompanying drawings and the description below. Other features and advantages will become apparent from the description, the drawings, and the claims.

BRIEF DESCRIPTION OF THE DRAWINGS

At least one example of the present invention will hereinafter be described in conjunction with the following figures, wherein like numerals denote like elements, and.

DETAILED DESCRIPTION

The following describes one or more example embodiments of the disclosed multi-coupler with breakaway feature, as shown in the accompanying figures of the drawings described briefly above. Various modifications to the example embodiment(s) may be contemplated by one of skill in the art.

Multi-couplers or multi-coupler assemblies enable multiple mating pairs of fluid lines and other communicative lines such as electric or another type, to be quickly connected (or disconnected) when attaching a work implement to (or detaching the work implement from) a work vehicle. In so doing, a multi-coupler assembly significantly reduces the amount of time required to attach and detach the work implement from the work vehicle, while helping to ensure that the various lines are coupled in a proper manner (e.g., such that connectors are appropriately aligned and joined). The multi-coupler assembly releasably locks the mating pairs of connectors in engagement. Disengagement of the connector pairs is prevented by the latched multi-coupler assembly until the operator later controls the multi-coupler assembly (e.g., by rotating a cam-lever device) to disconnect the connector pairs when later detaching the work implement from the work vehicle. In implementations in which the possibility of unintended detachment or "breakaway" of a work implement exists, the multi-coupler assembly examples described herein not only facilitate the connection and disconnection of multiple mating pairs of fluid connectors, but also avoid damage in the event of an implement breakaway event. The following describes embodiments of a work vehicle multi-coupler assembly having fail-safe breakaway functionality. Under normal operating conditions, the multi-coupler assembly permits mating banks of connectors to be quickly and accurately connected or disconnected, as desired. However, in the event of implement breakaway, the multi-coupler mechanism permits the controlled detachment of mating banks of fluid connectors in a manner reducing or substantially eliminating damage to the coupler mechanism, to the lines, and to the surrounding work implement and work vehicle components. In certain embodiments, the multi-coupler assembly may include a pair of coupling elements that mate with one another along a coupling axis. A shear pin is disposed on one of the coupling elements. A coupler mechanism is connected to the other coupling element and operates to engage the shear pin to bring the two coupling elements into mating engagement with the second coupling element. The coupler mechanism shears the shear pin to permit parting of the coupling elements along the coupling axis during a breakaway event.

The multi-coupler assembly described herein may be utilized in conjunction with any type of work vehicle having an interface at which multiple banks of connectors are joined and where damage may be incurred during a breakaway event absent the below-described breakaway functionality. Embodiments of the multi-coupler assembly may be particularly well-suited for usage in conjunction with work vehicles permitting the selective attachment of work implements, which carry fluid lines and/or fluid-driven devices. Tractors, for example, may be equipped with certain work implements, such as mowers, balers, tillage machines, seeders and other agricultural implements, which are towed behind the tractor and may be subject to breakaway. A breakaway event may occur, for example, should the work implement accidently catch on a stationary object, should the work implement not be securely connected to the work vehicle, or should a coupling component fail (e.g., drawbar, connecting pin, etc.). A breakaway event may also include scenarios where an operator fails to unlatch the multi-couplers before driving the work vehicle away from the work implement. Embodiments of the multi-coupler assembly are thus described below primarily in conjunction with a tractor to provide a representative, non-limiting context in which the multi-coupler assembly may be better understood.

Figure 1:
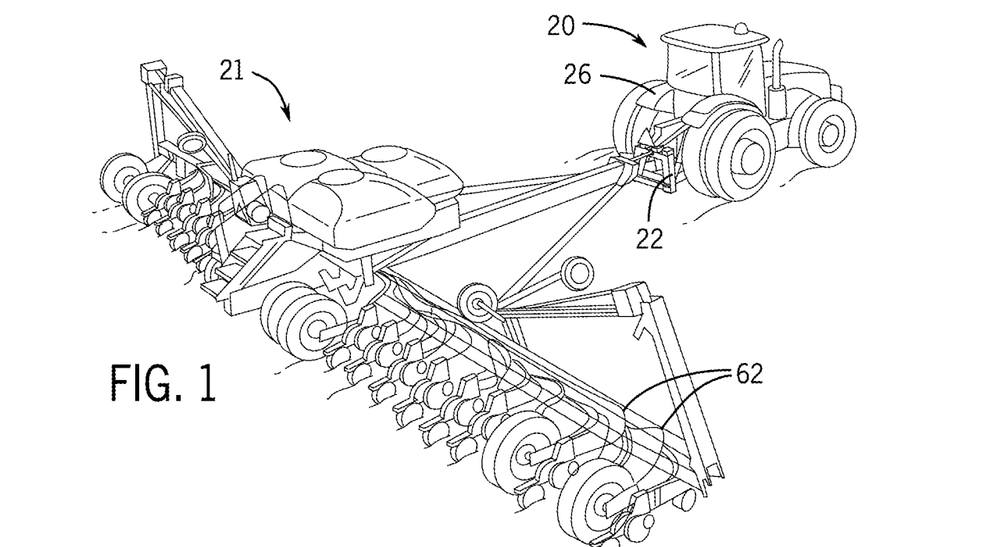
FIG. 1 is a simplified isometric view of an example work vehicle and connected work implement in the form of a tractor and planter, with which the multi-couplers with break-away features are used.
Figure 2:
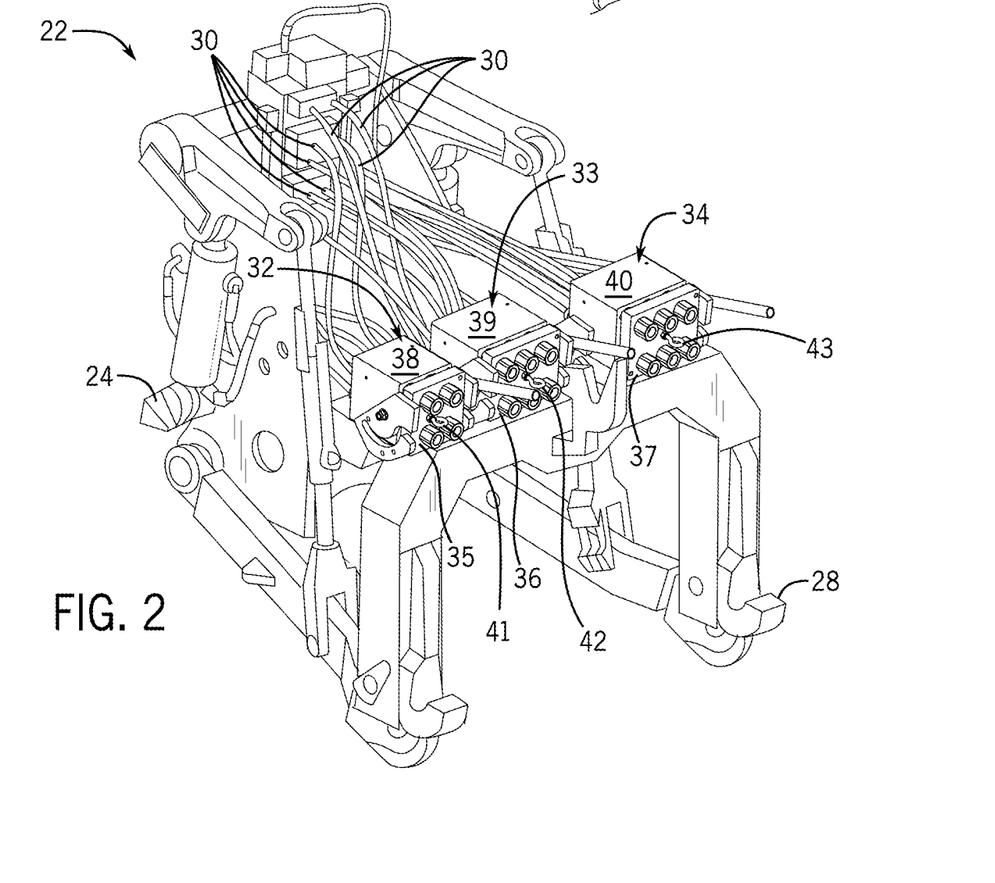
FIG. 2 is an isometric view of a three-point hitch assembly suitable for attachment to the tractor shown in FIG. 1 and equipped with a row of multi-coupler assemblies.

FIG. 1 is a side view of a work vehicle 20 in the form of a tractor having a body or chassis to which a work implement 21 in the form of a planter may be attached. Work implements of various types may be selectively attached and removed from the work vehicle 20 utilizing, for example, a hitch 22 of the three-point type as shown in FIG. 2. More specifically, and referring jointly to FIGS. 1 and 2, a leading end 24 of the hitch 22 may be mounted to a rear portion 26 of the work vehicle 20. Opposite the leading end 24, a trailing end 28 of the hitch 22 may be attached to a modular unit such as the work implement 21. The hitch 22 is equipped with a number of fluid lines 30 (only some of which are labeled in FIG. 2), which may supply working fluid and/or carrier fluid to fluid-driven devices of the work implement 21. The fluid lines 30 may include, for example, hydraulic lines through which hydraulic fluid is exchanged with hydraulic cylinders carried by the work implement, such as hydraulic cylinders utilized to transition the work implement 21 between a relatively wide deployed (unfolded) position and a relatively narrow transport (folded) position. In further embodiments, the fluid lines 30 can conduct another type of fluid (gas or liquid), such as pressurized airstreams supplied to one or more pneumatic devices. In some embodiments, the hitch 22 may be equipped with electric, optic or other communicative line types that may also require coupling to the work implement 21.

Three example multi-coupler assemblies 32-34 are mounted at or near the trailing end 28 of the hitch 22. The multi-coupler assemblies 32-34 enable a work vehicle operator, such as an operator of the work vehicle 20, to efficiently and accurately couple the fluid lines 30 supported by the hitch 22 to corresponding fluid lines carried by the work implement 21 shown in FIG. 1. Accordingly, the multi-coupler assemblies 32-34 each include at least two groups or banks of mating fluid connectors carried respectively, in coupling elements 35-37 and in coupling elements 38-40. The mating pairs of fluid connectors may be coupled (and decoupled) utilizing the multi-coupler assemblies 32-34 to connect (and disconnect) the fluid lines 30 to the corresponding plurality of fluid lines carried by work implement 21. The fluid connectors joined to the fluid lines 30 are contained within the coupling elements 38-40. The fluid lines carried by work implement 21 are not shown in FIG. 1 for illustrative clarity; however, the fluid connectors shown on the coupling elements 35-37 will be connected with the implement's fluid lines. In the illustrated example, multi-coupler assembly 32 includes four pairs of mating connectors, while the multi-coupler assemblies 33 and 34 each contain six pairs of mating connectors. In further embodiments, each multi-coupler assembly may contain a greater or lesser number of connector pairs, and the hitch 22 (or another part of the work vehicle 20) may be equipped with any suitable number of multi-coupler assemblies. In other examples, the multi-coupler assemblies 32-34 include connectors for other types of power or communicative lines. The multi-coupler assemblies 32-34 also include eyebolts 41-43 to which cables (not shown in FIG. 2) are attached to secure the coupling elements 35-37 to the work implement 21 as further described below.

Figure 3:
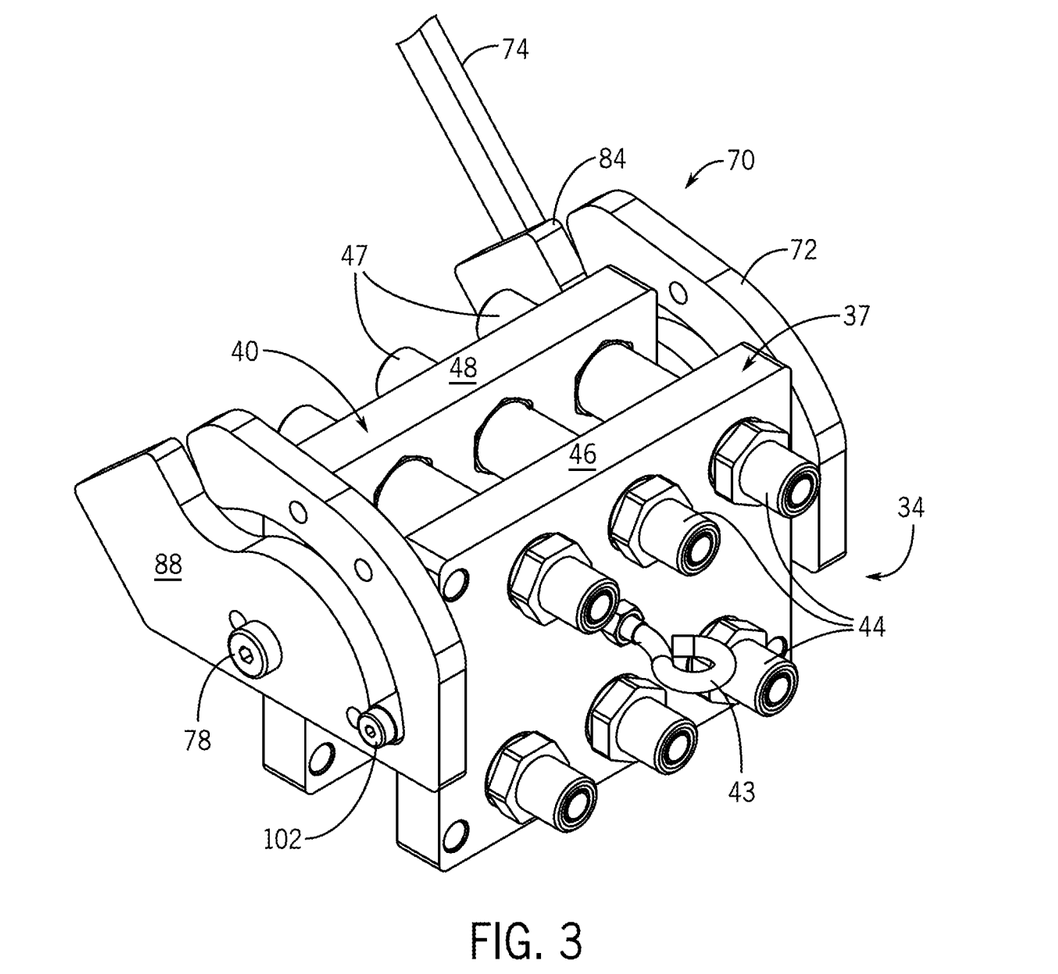
FIG. 3 is an isometric view illustrating one of the multi-coupler assemblies of FIG. 2.
Figure 4:
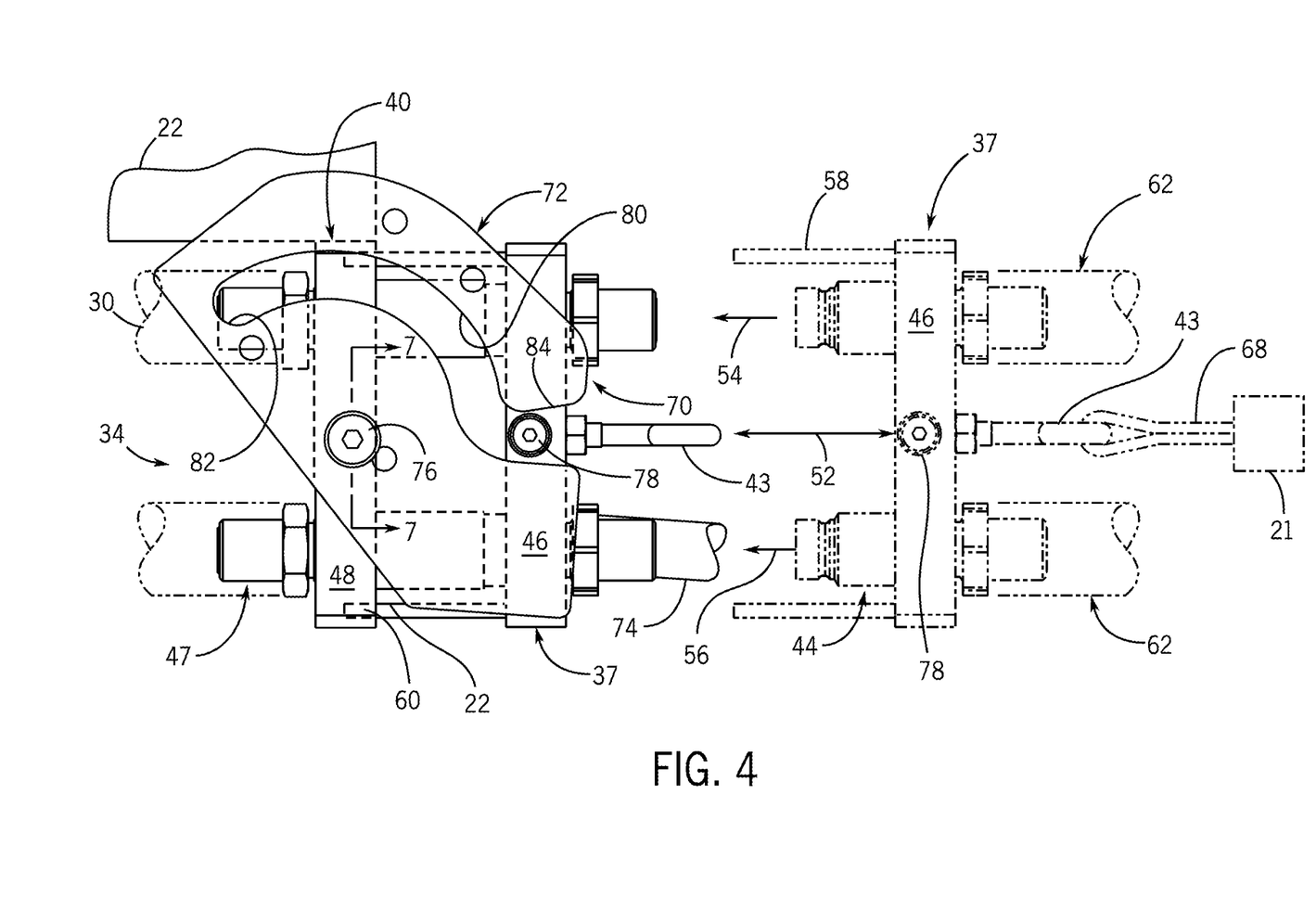
FIG. 4 is a side view illustrating the multi-coupler assembly of FIG. 3 being brought into mating engagement.

The example multi-coupler assembly 34 will now be described in detail in conjunction with FIGS. 3-8. While focusing on the multi-coupler assembly 34, the following description is equally applicable to the other multi-coupler assemblies 32, 33 shown in FIG. 2, which may be substantially identical to the multi-coupler assembly 34 in the case of the assembly 33 or similar to the multi-coupler assembly 34 in the case of the assembly 32. Referring to FIG. 3, and as previously noted, the multi-coupler assembly 34 includes an implement-side bank of fluid connectors 44 carried by the coupling element 37 in a connector block 46. The fluid connectors 44 are registered or maintained in a desired spatial arrangement by the connector block 46. The multi-coupler assembly 34 further includes a vehicle-side bank of fluid connectors 47 carried by the coupling element 40 and that extend into the connector block 48 for connecting with the fluid connectors 44 as further described below. Referring additionally to FIG. 4, the coupling elements 37, 40 may simultaneously couple corresponding pairs of the connectors 44, 47 when brought into an axially-adjacent or end-to-end position along a coupling axis 52 on respective centers 54, 56. Locating pins 58 may be utilized to ensure proper alignment of the coupling elements 37, 40 when brought into an initial engaged position and into apertures 60, from the separated position shown in phantom.

As noted above, the coupling element 40 is mounted on the hitch 22 and therethrough is fixed to the work vehicle 20. The fluid lines 30 connect with the fluid connectors 47 so that fluids for the functions they serve are available at the coupling element 40. The coupling element 37 includes the fluid connectors 44 which mate with the fluid connectors 47 and which are connected with the fluid lines 62 (also shown in FIG. 1) of the work implement 21. When the fluid connectors 44, 47 are fully engaged, the fluid lines 62 are fluidly coupled with the fluid lines 30. The coupling element 37 includes an eyebolt 43 fixed to the connector block 46 that is connected to a tether 68. In this example the tether 68 is a cable but may take a variety of forms. The tether 68 functions to connect the coupling element 37 with the work implement 21 in a spatially limited fashion. The coupling element 37 may be moved relative to the work implement 21 for coupling with the coupling element 40 but its movement is limited by the tether 68 so that the maximum spacing between the work implement 21 and the coupling element 37 is less than a distance which would stress the fluid lines 62.

Figure 5:
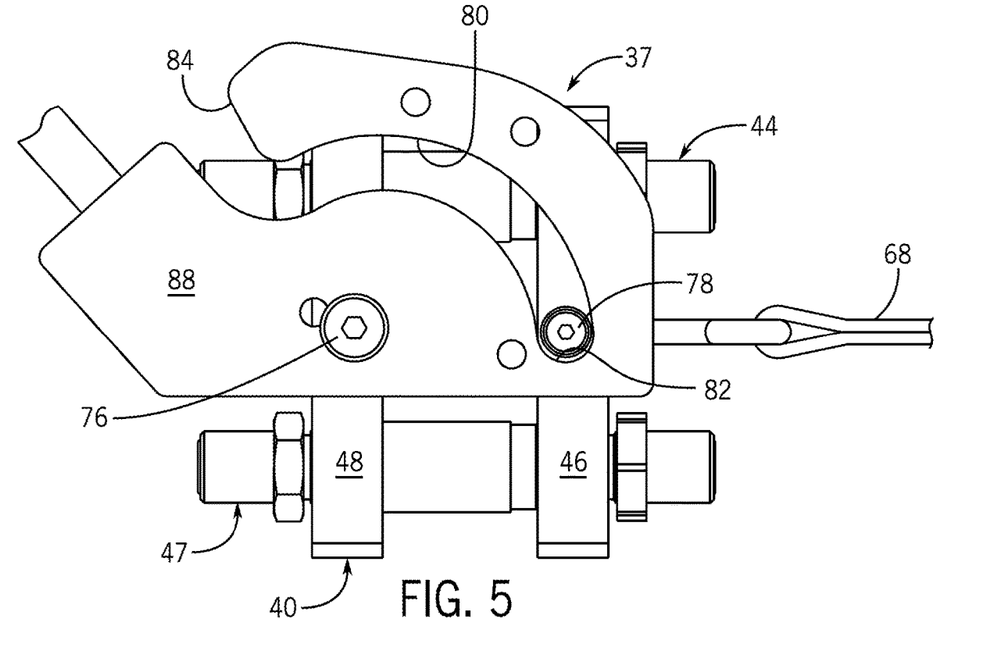
FIG. 5 is a side view of the multi-coupler assembly of FIG. 3 shown in a coupled, latched state.

The multi-coupler assembly 34 includes a coupler mechanism 70 that in general, includes a latch plate 72, a lever 74, and a pivot shaft 76. The coupler mechanism 70 cooperates with a shear pin assembly 78. The latch plate 72 is connected with the connector block 48 by the pivot shaft 76, which enables rotation of the latch plate 72 between an unlatched position shown in FIG. 4, and a latched position shown in FIG. 3. The lever 74 is connected to the latch plate 72 and is used to manually rotate the latch plate 72 between its various positions. The pivot shaft 76 extends through the connector block 48 and serves as the pivot for the latch plate 72 and the lever 74. The latch plate 72 defines a cam slot 80 that includes a blind end 82 and an open end 84. The shear pin assembly 78 extends from the connector block 46 parallel with the pivot shaft 76 when the coupling elements 37, 40 are aligned with each other. The shear pin assembly 78 is configured to be captured by the open end 84 of the cam slot 80 when the coupling elements 37, 40 are initially mated together. The cam slot 80 is closest to the pivot shaft 76 at the blind end 82 and farthest from the pivot shaft 76 at the open end 84 so that rotation 86 (in a clockwise direction as viewed), of the lever 74 and latch plate 72 with the shear pin assembly 78 captured in the cam slot 80, pulls the coupling element 37 toward the coupling element 40 to securely mate the two and to lock them together as shown in FIG. 5. Rotation (in a counter-clockwise direction as viewed), of the lever 74 pushes the coupling element 37 away from the coupling element 40 to unlock and decouple the two.

Figure 6:
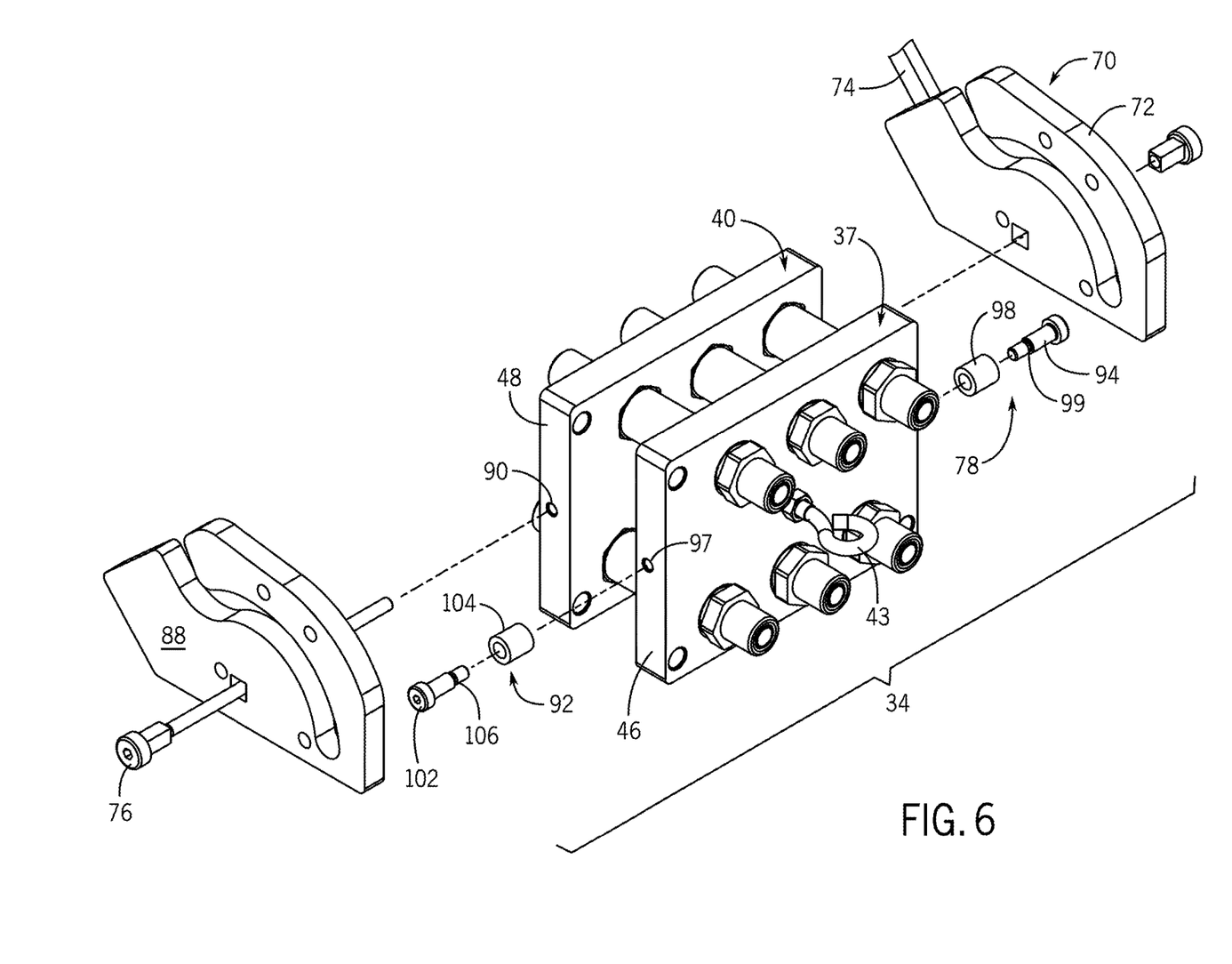
FIG. 6 is a simplified, partially exploded isometric view of the multi-coupler assembly of FIG. 3.

The multi-coupler assembly 34 is illustrated in FIG. 6 in partially exploded form with some parts omitted for simplicity. The coupler mechanism 70 includes a second latch plate 88 on an opposite side of the connector block 48 from the latch plate 72. The pivot shaft 76 is configured to extend through an opening 90 in the connector block 48 for connection with both the latch plate 72 and the latch plate 88 so that the lever 74 rotates both together. A second shear pin assembly 92 is configured for attaching to the connector block 46 on an opposite side from the shear pin assembly 78 and for cooperating in the coupler mechanism 70 with the latch plate 88. The shear pin assembly 78 includes a shear pin 94 configured to engage in an opening 96 (shown in FIG. 7) of the connector block 46, such as via complementary threads, so that it is readily replaceable. A collar 98 is constructed in a hollow cylindrical form and is configured to receive the shear pin 94 prior to its engagement with the connector block 46. The collar 98 may be rolling or fixed when the shear pin assembly 78 is connected with the connector block 46. The shear pin 94 includes a segment 99 with a reduced diameter as further described below. Similarly, the shear pin assembly 92 includes a shear pin 102 configured to engage in an opening 97 of the connector block 46. A collar 104 in a hollow cylindrical form is configured to receive the shear pin 102 prior to its engagement with the connector block 46. The collar 104 may be rolling or fixed when the shear pin assembly 92 is connected with the connector block 46. The shear pin 102 also includes a segment 106 with a reduced diameter.

Figure 7:
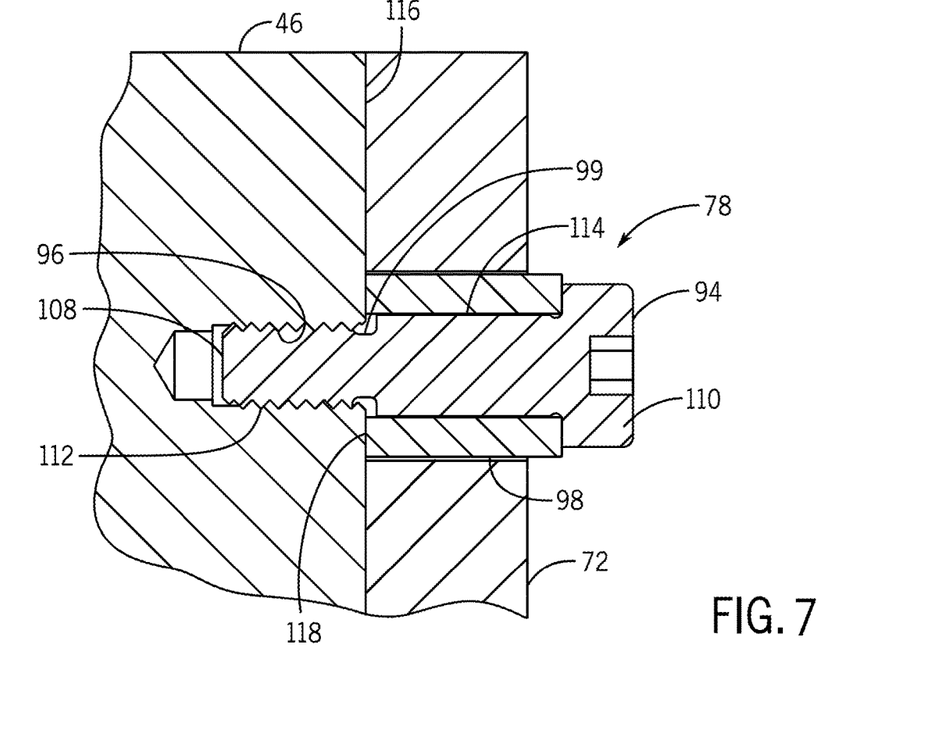
FIG. 7 is a cross sectional illustration taken generally through the line 7-7 of FIG. 4 showing part of the multi-coupler assembly at a shear pin assembly.

Illustrated in FIG. 7 is a section through the shear pin assembly 78 as connected with the connector block 46. The shear pin 94 includes an end 108 opposite a head 110, which has an enlarged diameter. A threaded segment 112 extends from the end 108 toward the head 110 and is received in the opening 96. The segment 99 is disposed adjacent the threaded segment 112. A segment 114 extends between the segment 99 and the head 110 and has a diameter larger than that of the segment 99 and smaller than that of the head 110. The collar 98 is disposed around the shear pin 94 and specifically around the segments 99 and 114, spacing the head 110 away from the connector block 46 so that the segment 99 is located at or adjacent the edge 116 of the connector block 46. This places the inboard end 118 of the collar 98, which faces the edge 116, at a location aligned within the segment 99. The shear pin assembly 92 is similarly arranged at the opposite side of the connector block 46.

Figure 8:
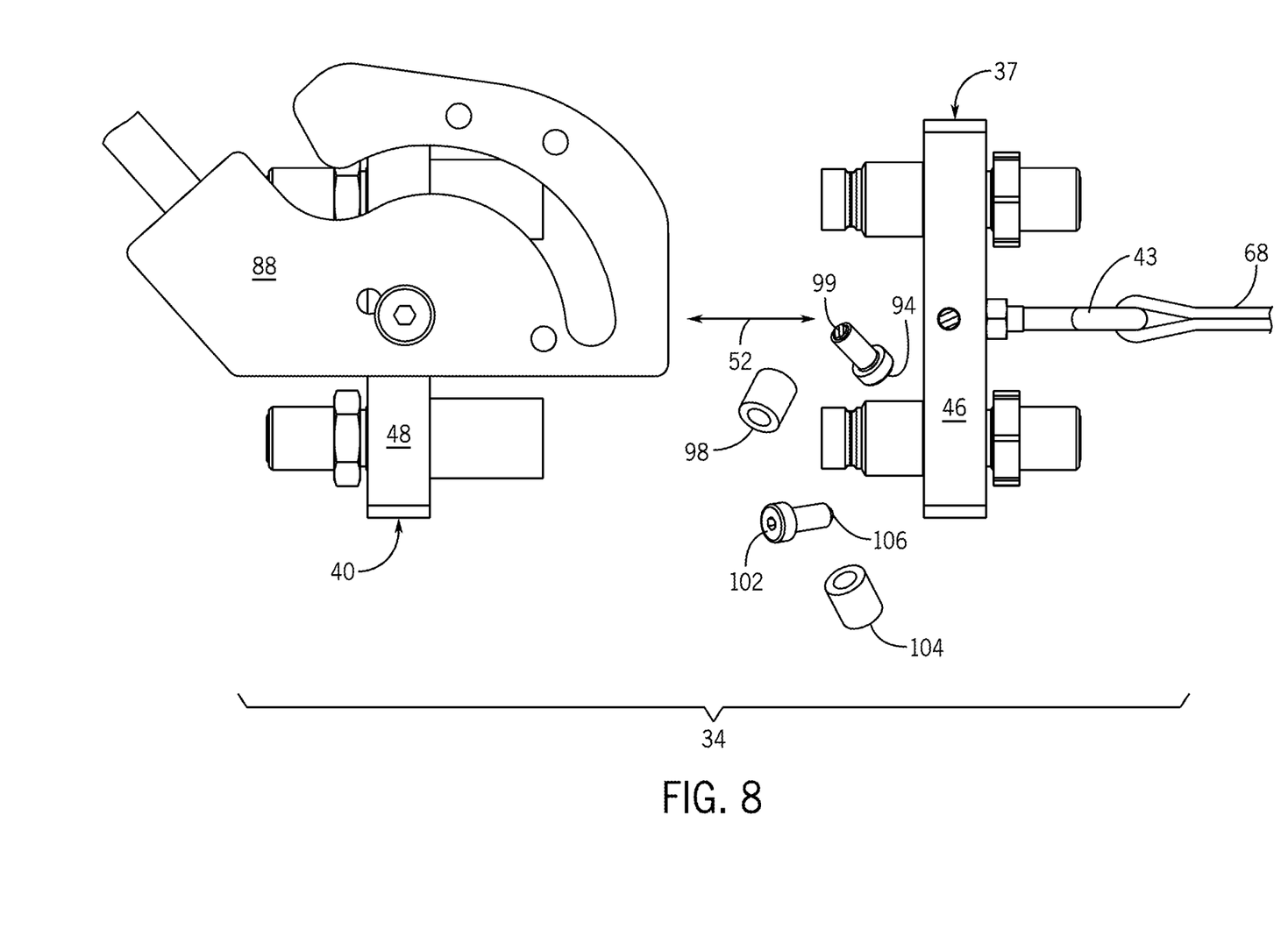
FIG. 8 is a side view illustrating separation of the multi-coupler assembly of FIG. 3 during a breakaway event.

The multi-coupler assemblies 32-34 are equipped with a breakaway feature that facilitates controlled disengagement. As shown in FIG. 8, the multi-coupler assembly 34 enables controlled disengagement of the coupling element 37 from the coupling element 40 along the coupling axis 52 during a breakaway event. The breakaway feature allows for the controlled disengagement while the coupler mechanism 70 is in the latched position and without requiring movement of the coupler mechanism 70 therefrom. In the illustrated example, the breakaway feature generally includes the shear pin assemblies 78, 92 and the latch plates 72, 88. In addition, the breakaway feature includes a mechanism or device for exerting a divergent force on the coupling element 37 prior to the exertion of significant pulling forces on the fluid lines. For example, as indicated in FIGS. 3 and 7, the multi-coupler assembly 34 is equipped with the tether 68 having a first end connected to the implement-side connector block 46 through the eyebolt 43. Opposite the attachment point to the connector block 46, the second end of the tether 68 is attached to the work implement 21. When the work implement 21 is hitched to the work vehicle 20 such as at the hitch 22 and the multi-coupler assembly 34 are connected, the tether 68 is imparted with a slack length that is less than a slack length of each of the plurality of fluid lines 62, as measured along respective lengths of the plurality of fluid lines 62 taken from the connector block 46 to their respective attachment points on the work implement 21. In this manner, the tether 68 will exert a pull force on the connector block 46 during a breakaway event to apply divergent movement of the coupling elements 37, 40 along the coupling axis 52 and therefore, disengagement of the fluid connectors 44, 47. Stated differently, the tether 68 is dimensioned (e.g., imparted with a particular length) such that a breakaway pull force is exerted on the connector block 46 through the tether 68 rather than through the fluid connectors 44 and their associated fluid lines 62 during a breakaway event.

As illustrated in FIG. 8, a breakaway event involves shearing of the shear pins 94, 102 to release the coupling element 37 from the coupling element 40 so that it may remain with the work implement 21 while the work vehicle 20 pulls away, without damaging the fluid lines 30, 62 or the fluid connectors 44, 47. Specifically, during a breakaway event, the tether 68 exerts a force on the eyebolt 43 and therethrough on the connector block 46 forcing the latch plates 72, 88 to shear the shear pins 94, 102 at their respective segments 99, 106, pulling the fluid connectors 44 to disengage from the fluid connectors 47. The latch plates 72, 88 apply force on the shear pins 94, 102 through the collars 98, 104, respectively. As shown in FIG. 7, the collar 98 for example, has its inboard end 118 aligned with the segment 99 to shear the shear pin 94 at that area of reduced diameter. The shear strength of the shear pins 94, 102 is such that they support the weight of the fluid lines 62 with incidental movement such as sway and jostling, while shearing at a force that is under the tensile strength limit of the tether 68.

Figure 9:
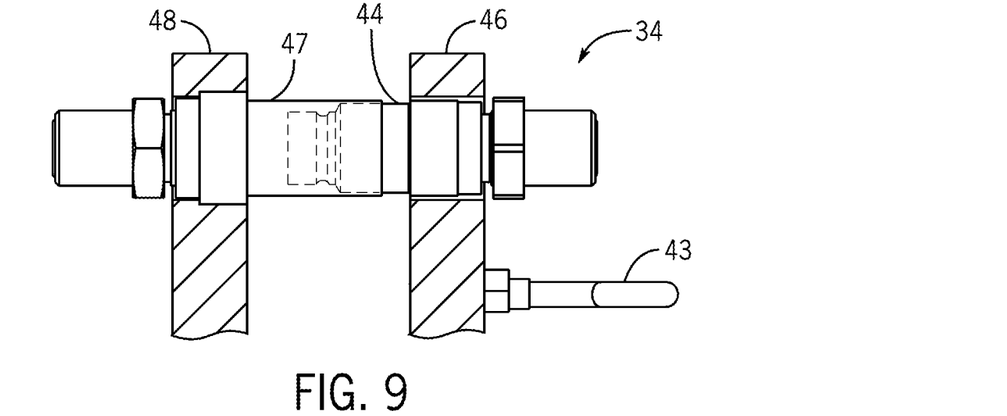
FIG. 9 is a fragmentary, simplified, cross sectional illustration of part of the multi-coupler assembly of FIG. 3.

To facilitate their disengagement in a breakaway event, the fluid connectors 44, 47 are configured to rely on the coupler mechanism 70 for holding them together against their internal pressures and other forces such as those imparted by the weight and movement of the fluid lines 62. As shown in FIG. 9 in simplified form, a representative fluid connector 44 carried by the connector block 46 is sliding-received within the mating fluid connector 47 carried by the connector block 48. The fluid connectors 44, 47 are configured to be held together by the latched connector blocks 46, 48 without the use of a locking sleeve or other locking mechanism on the individual connectors. The foregoing notwithstanding, it is emphasized that various other types of mating fluid connectors may be utilized in further embodiments of the multi-coupler assembly 34 with breakaway feature.

Figure 10:
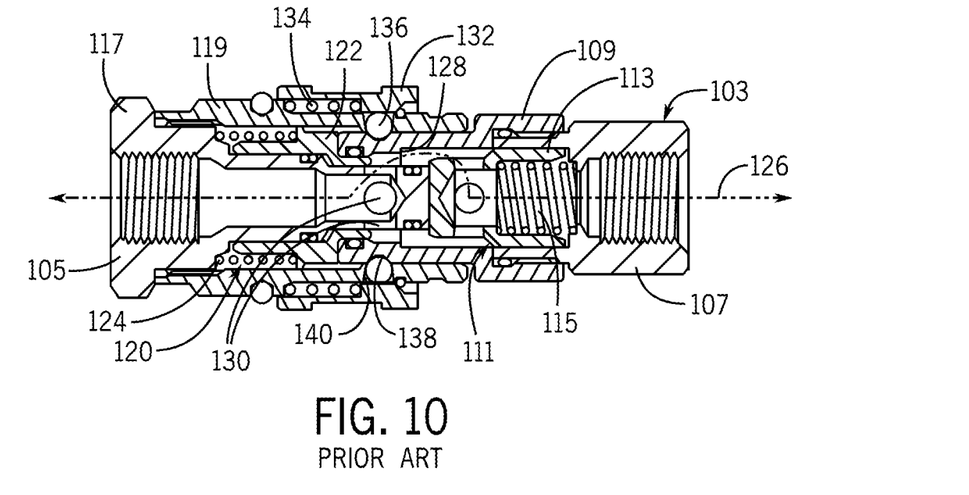
FIG. 10 is a cross sectional illustration of a prior art fluid connector.

Typical fluid connectors are self-latching devices, including components such as a locking sleeve to hold them together once connected. Such self-latching fluid connectors may be designed such that an individual latching force is generated by each mating pair of fluid connectors when brought into mating engagement. FIG. 10 illustrates such a prior art fluid connector pair 103, 105. The fluid connector 103 is an assembly that includes a threaded fitting 107 fixed to a coupling fitting 109. A check valve assembly 111 is carried within the mated threaded fitting 107 and coupling fitting 109. The check valve assembly 111 includes a valve body 113, and a spring 115. The fluid connector 105 is also an assembly that includes a threaded fitting 117 and a coupling fitting 119. A check valve assembly 120 is carried outside the threaded fitting 117 and within the coupling fitting 119. The check valve assembly 120 includes a valve body 122, and a spring 124. When the fluid connectors 103, 105 are coupled together, the threaded fitting 117 engages and pushes the valve body 113 compressing the spring 115 and opening the check valve assembly 111. Also, when the fluid connectors 103, 105 are coupled together, the coupling fitting 109 engages and pushes the valve body 122 compressing the spring 124 and opening the check valve assembly 120. Engagement of the fluid connectors 103, 105 and opening of the check valve assemblies 111, 120 results in a flow path 126 through the fluid connectors 103, 105. When the fluid connectors 103, 105 are uncoupled, the valve body 113 is configured to seat against a valve seat 128 on the coupling fitting 109 under force of the spring 115, sealing the fluid connector 103. Also, when the fluid connectors 103, 105 are uncoupled, the valve body 122 slides over the openings 130 in the threaded fitting 117 under force of the spring 124, sealing the fluid connector 105.

To hold the fluid connectors 103, 105 together, the fluid connector 105 includes a self-latching feature including locking sleeve 132, spring 134 and locking balls 136. The coupling fitting 109 includes an annular groove 138 that cooperates with the locking balls 136. The locking balls are carried in apertures 140 in the coupling fitting 119 and are retained therein by the locking sleeve 132. When the fluid connectors 103, 105 are coupled together, the coupling fitting 109 slides within the coupling fitting 119 with the locking balls 136 becoming lodged in the annular groove 138 locking the fluid connectors 103, 105 together. In operating, fluid pressure along the flow path 126 acts on the inside of the coupling fitting 109 forcing it against the locking balls 136, which are contained by the locking sleeve 132, so that the pressure acts to further lock the fluid connectors 103, 105 together to maintain coupling.

Figure 11:
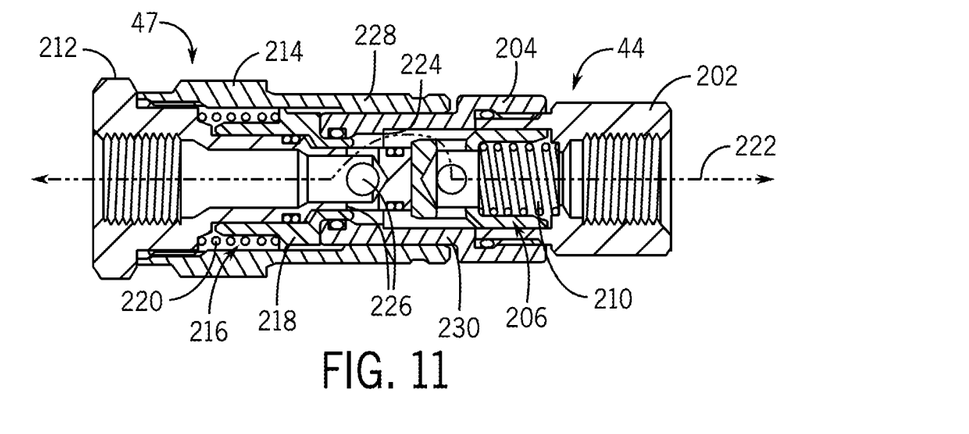
FIG. 11 is a cross sectional illustration of one fluid connector of the multi-coupler assembly of FIG. 3.

Referring to FIG. 11, the fluid connectors 44, 47 of the multi-coupler assembly 34 are shown in detail. The fluid connector 44 is an assembly that includes a fitting 202 fixed to a coupling fitting 204. The fitting 202 includes threads to connect with the fluid lines 62 in this example, but may include other forms of joining for connecting therewith. A check valve assembly 206 is carried within the fitting 202 and the paired coupling fitting 204. The check valve assembly 206 includes a valve body 208, and a spring 210. The fluid connector 47 is also an assembly that includes a fitting 212 and a coupling fitting 214. A check valve assembly 216 is carried outside the fitting 212 and within the coupling fitting 214. The check valve assembly 216 includes a valve body 218, and a spring 220. When the fluid connectors 44, 47 are coupled together, the fitting 212 engages and pushes the valve body 208 compressing the spring 210 and opening the check valve assembly 206. Also, when the fluid connectors 44, 47 are coupled together, the coupling fitting 204 engages and pushes the valve body 218 compressing the spring 220 and opening the check valve assembly 216. Engagement of the fluid connectors 44, 47 and opening of the check valve assemblies 206, 216 results in a flow path 222 through the fluid connectors 44, 47. When the fluid connectors 44, 47 are uncoupled, the valve body 208 is configured to seat against a valve seat 224 on the coupling fitting 204 under force of the spring 210, sealing the fluid connector 44. Also, when the fluid connectors 44, 47 are uncoupled, the valve body 218 slides over the openings 226 in the fitting 212 under force of the spring 220, sealing the fluid connector 47. Accordingly, during decoupling, including during a breakaway event, the check valve assemblies 206, 216 automatically close.

The coupling fitting 214 includes a straight cylindrically shaped segment 228 that is free of apertures for locking balls as there are no locking balls, no locking sleeve and no spring for a locking sleeve. The coupling fitting 204 includes a cylindrical segment 230 that is free of any annular groove that would otherwise cooperate with locking balls. As a result, the fluid connectors 44, 47 are simplified and more economical than other fluid connectors. Since they reside in the connector blocks 46, 48 which are locked together by the coupler mechanism 70 as shown in FIG. 5, they will not separate under pressure in the flow path 222. Instead, the fluid connectors 44, 47 withstand the separation force exerted by internal fluid pressure due to the latched coupler mechanism 70. Upon a breakaway event, shearing of the shear pins 94, 102 allows the connector blocks 46, 48 to separate and as noted, the check valve assemblies 206, 216 close automatically to avoid fluid leaks. As there are no locking balls or locking sleeve, the fluid connectors 44, 47 do not hinder shearing of the shear pins 94, 102. During coupling, the check valve assemblies 206, 216 are opened, and during decoupling the check valve assemblies 206, 216 are closed, so that the coupling elements 37, 40 may be coupled and decoupled under pressure with fluid maintained in the fluid lines 30, 62.

There has thus been provided embodiments of a work vehicle multi-coupler assembly having a controlled breakaway functionality. In the event of implement breakaway, the multi-coupler assembly permits the controlled detachment of mating banks of fluid connectors in a manner that reduces or substantially eliminates the likelihood of damage to the fluid lines, and to the surrounding work vehicle and work implement components. The breakaway feature may be integrated into the multi-coupler assembly. A tether may further be connected to the implement-side connector block and provided with a slack length less than the respective slack lengths of one or more fluid lines carried by the implement. In this manner, a pull force urging separation of the connector blocks will be primarily or exclusively applied through the tether rather than through the fluid lines should a breakaway event occur. The pull force results in shearing of one or more shear pins of the multi-coupler assembly, which may be readily replaced to recouple the multi-coupler assembly.

Also, the following examples are provided, which are numbered for easier reference.

1. A multi-coupler assembly, including a first coupling element; a second coupling element configured to mate with the first coupling element along a coupling axis; a shear pin on the first coupling element; and a coupler mechanism connected to the second coupling element and configured to engage the shear pin to bring the first coupling element into mating engagement with the second coupling element; wherein the coupler mechanism is configured to shear the shear pin to permit movement of the first coupling element away from the second coupling element along the coupling axis during a breakaway event.

2. The assembly of example 1, wherein the first coupling element includes a first bank of fluid connectors and the second coupling element includes a second bank of fluid connectors configured to couple with the first bank of fluid connectors, and wherein the shear pin and the coupler mechanism are configured to hold the first and second banks of fluid couplers together when the assembly is in a coupled position.

3. The assembly of example 2, wherein each of the fluid connectors in the second bank of fluid connectors is configured to freely slide within a mating fluid connector in the first bank of fluid connectors, and is retained in the mating fluid connector solely by engagement of the shear pin with the coupler mechanism.

4. The assembly of example 3, wherein the coupler mechanism includes a rotating latch plate with a cam slot that receives the shear pin when the first and second coupling elements are coupled together.

5. The assembly of example 4, wherein the latch plate is movable between first and second rotational positions; and wherein the latch plate exerts a convergent coupling force across the first and second banks of fluid connectors when moved from the first rotational position toward the second rotational position to bring the first and second banks of fluid connectors into mating engagement.

6. The assembly of example 5, wherein the latch plate is configured to remove the convergent coupling force when moved into the second rotational position.

7. The assembly of example 1, further comprising a tether connected to the first coupling element and configured to exert a pull force on the first coupling element to shear the shear pin through the coupler mechanism.

8. The assembly of example 7, wherein the tether is attached to an implement and the second coupling element is attached to a work vehicle.

9. The assembly of example 7, wherein: the first coupling element includes a first bank of fluid connectors; the second coupling element includes a second bank of fluid connectors configured to couple with the first bank of fluid connectors; the fluid connectors in the second bank of fluid connectors are each configured to freely slide within a mating fluid connector in the first bank of fluid connectors, and are retained in the first bank of fluid connectors solely by the shear pin and the coupler mechanism; the shear pin is configured to withstand a first separation force exerted between the first and second coupling elements by a fluid pressure in the first and second banks of fluid connectors; and the shear pin is configured to shear in response to the pull force, allowing the second bank of fluid connectors to freely separate from the first bank of fluid connectors.

10. The assembly of example 7, wherein the coupler mechanism is configured to remain stationary relative to the second coupling element when the pull force is exerted.

11. The assembly of example 10, wherein the coupler mechanism includes a cam slot in which the shear pin is disposed when the first and second coupling elements are coupled together; and wherein the cam slot has an open end and a closed end with a segment adjacent the closed end that is disposed to extend in a direction substantially perpendicular to the coupling axis.

12. A multi-coupler assembly for a work vehicle and implement coupling arrangement, the assembly including a first coupling element that has a first bank of fluid connectors in continuous fluid communication with the implement; a tether connected with the first coupling element and with the implement and configured to exert a pull force on the first coupling element during a breakaway event; a second coupling element that is fixed to the work vehicle and that has a second bank of fluid connectors in continuous fluid communication with the work vehicle, the second coupling element configured to mate with the first coupling element along a coupling axis to place the first bank of fluid connectors in fluid communication with the second bank of fluid connectors; a shear pin fixed to the first coupling element; and a coupler mechanism carried by the second coupling element and configured to engage the shear pin to bring the first coupling element into mating engagement with the second coupling element; wherein during the breakaway event the coupler mechanism is configured to shear the shear pin to move the second coupling element along the coupling axis and with the work vehicle away from the first coupling element and the implement, while the coupler mechanism remains stationary relative to the second coupling element.

13. The assembly of example 12, wherein the shear pin and the coupler mechanism are configured to hold the first and second banks of fluid connectors together when the assembly is in a coupled position.

14. The assembly of example 12, wherein each fluid connector in the second bank of fluid connectors is configured to freely slide within a mating fluid connector in the first bank of fluid connectors, and is retained in the first bank of fluid connectors solely by the shear pin and the coupler mechanism.

15. The assembly of example 14, wherein the coupler mechanism includes a rotating latch plate with a cam slot that receives the shear pin when the first and second coupling elements are coupled together.

While at least one example embodiment has been presented in the foregoing description, it should be appreciated that a vast number of variations exist. It should also be appreciated that the example embodiment(s) are only examples, and are not intended to limit the scope, applicability, or configuration of the invention in any way. Rather, the foregoing description will provide those skilled in the art with a convenient road map for work implementing an example embodiment of the invention. It should be understood that various changes may be made in the function and arrangement of elements described in the foregoing examples without departing from the scope of the invention as set-forth in the appended claims.

What is claimed is:

1. A multi-coupler assembly, comprising:
    a first coupling element including a first bank of fluid connectors;
    a second coupling element configured to mate with the first coupling element along a coupling axis, the second coupling element including a second bank of fluid connectors configured to couple with the first bank of fluid connectors;
    a shear pin on the first coupling element; and
    a coupler mechanism connected to the second coupling element and configured to engage the shear pin to bring the first and second banks of fluid couplers together when the assembly is in a coupled position;
    wherein the coupler mechanism is configured to shear the shear pin to permit movement of the first coupling element away from the second coupling element along the coupling axis during a breakaway event.

2. The assembly of claim 1, further including a collar disposed about the shear pin and having an inboard end; wherein the shear pin has an area of reduced diameter aligned with the inboard end of the collar such that the collar shears the shear pin during the breakaway event.

3. The assembly of claim 1, wherein each of the fluid connectors in the second bank is configured to freely slide within a mating fluid connector in the first bank of fluid connectors, and is retained in the mating fluid connector solely by engagement of the shear pin with the coupler mechanism.

4. The assembly of claim 3, wherein the coupler mechanism includes a rotating latch plate with a cam slot that receives the shear pin when the first and second coupling elements are coupled together.

5. The assembly of claim 4, wherein the latch plate is movable between first and second rotational positions; and wherein the latch plate exerts a convergent coupling force across the first and second banks of fluid connectors when moved from the first rotational position toward the second rotational position to bring the first and second banks of fluid connectors into mating engagement.

6. The assembly of claim 5, wherein the latch plate is configured to remove the convergent coupling force when moved into the second rotational position.

7. The assembly of claim 1, further comprising a tether connected to the first coupling element and configured to exert a pull force on the first coupling element to shear the shear pin through the coupler mechanism.

8. The assembly of claim 7, wherein the tether is attached to an implement and the second coupling element is attached to a work vehicle.

9. The assembly of claim 7, wherein:
    the first coupling element includes a first bank of fluid connectors;
    the second coupling element includes a second bank of fluid connectors configured to couple with the first bank of fluid connectors;
    the fluid connectors in the second bank of fluid connectors are each configured to freely slide within a mating fluid connector in the first bank of fluid connectors, and are retained in the first bank of fluid connectors solely by the shear pin and the coupler mechanism;
    the shear pin is configured to withstand a first separation force exerted between the first and second coupling elements by a fluid pressure in the first and second banks of fluid connectors; and
    the shear pin is configured to shear in response to the pull force, allowing the second bank of fluid connectors to freely separate from the first bank of fluid connectors.

10. The assembly of claim 7, wherein the coupler mechanism is configured to remain stationary relative to the second coupling element when the pull force is exerted.

11. The assembly of claim 10, wherein the coupler mechanism includes a cam slot in which the shear pin is disposed when the first and second coupling elements are coupled together; and wherein the cam slot has an open end and a closed end with a segment adjacent the closed end that is disposed to extend in a direction substantially perpendicular to the coupling axis.

12. A multi-coupler assembly for a work vehicle and implement coupling arrangement, the assembly comprising:
   a first coupling element that has a first bank of fluid connectors in continuous fluid communication with the implement;
   a tether connected with the first coupling element and with the implement and configured to exert a pull force on the first coupling element during a breakaway event;
   a second coupling element that is fixed to the work vehicle and that has a second bank of fluid connectors in continuous fluid communication with the work vehicle, the second coupling element configured to mate with the first coupling element along a coupling axis to place the first bank of fluid connectors in fluid communication with the second bank of fluid connectors;
   a shear pin fixed to the first coupling element; and
   a coupler mechanism carried by the second coupling element and configured to engage the shear pin to bring the first coupling element into mating engagement with the second coupling element;
   wherein during the breakaway event the coupler mechanism is configured to shear the shear pin to move the second coupling element along the coupling axis and with the work vehicle away from the first coupling element and the implement, while the coupler mechanism remains stationary relative to the second coupling element.

13. The assembly of claim 12, wherein the shear pin and the coupler mechanism are configured to hold the first and second banks of fluid connectors together when the assembly is in a coupled position.

14. The assembly of claim 12, wherein each fluid connector in the second bank of fluid connectors is configured to freely slide within a mating fluid connector in the first bank of fluid connectors, and is retained in the first bank of fluid connectors solely by the shear pin and the coupler mechanism.

15. The assembly of claim 14, wherein the coupler mechanism includes a rotating latch plate with a cam slot that receives the shear pin when the first and second coupling elements are coupled together.

16. The assembly of claim 15, wherein the latch plate is movable between first and second rotational positions; and
   wherein the latch plate exerts a convergent coupling force across the first and second banks of fluid connectors when moved from the first rotational position toward the second rotational position to bring the first and second banks of fluid connectors into mating engagement.

17. The assembly of claim 16, wherein the coupler mechanism is configured to remove the convergent coupling force when moved into the second rotational position.

18. The assembly of claim 12, wherein:
   the fluid connectors in the second bank of fluid connectors are each configured to freely slide within a mating fluid connector in the first bank of fluid connectors, and are retained in the first bank of fluid connectors solely by the shear pin and the coupler mechanism;
   the shear pin is configured to withstand a first separation force exerted between the first and second coupling elements by a fluid pressure in the first and second banks of fluid connectors; and
   the shear pin is configured to shear in response to the pull force.

19. The assembly of claim 18, wherein the coupler mechanism is configured to remain stationary relative to the second coupling element when the pull force is exerted.

20. A multi-coupler assembly for a work vehicle and implement coupling arrangement, the assembly comprising:
   a first coupling element that has a first bank of fluid connectors in continuous fluid communication with the implement;
   a tether connected with the first coupling element and with the implement;
   a second coupling element that is fixed to the work vehicle and that has a second bank of fluid connectors in continuous fluid communication with the work vehicle, the second coupling element configured to mate with the first coupling element along a coupling axis to place the first bank of fluid connectors in fluid communication with the second bank of fluid connectors;
   a shear pin fixed to the first coupling element; and
   a coupler mechanism carried by the second coupling element and configured to engage the shear pin to bring the first coupling element into mating engagement with the second coupling element, wherein the coupler mechanism includes a cam slot in which the shear pin is disposed when the first and second coupling elements are coupled together, wherein the cam slot has an open end and a closed end with a segment adjacent the closed end that is disposed to extend in a direction substantially perpendicular to the coupling axis;
   wherein during a breakaway event the coupler mechanism is configured to shear the shear pin to move the second coupling element along the coupling axis and with the work vehicle away from the first coupling element and the implement, while the coupler mechanism remains stationary relative to the second coupling element.

* * * * *